(12) United States Patent
Serrurier

(10) Patent No.: US 9,499,958 B2
(45) Date of Patent: Nov. 22, 2016

(54) REPLACEABLE WEAR MEMBER AND REPLACEABLE WEAR MEMBER SYSTEM

(71) Applicant: Caterpillar Inc., Peoria, IL (US)

(72) Inventor: Douglas Serrurier, Morton, IL (US)

(73) Assignee: Caterpillar Inc., Peoria, IL (US)

( * ) Notice: Subject to any disclaimer, the term of this patent is extended or adjusted under 35 U.S.C. 154(b) by 138 days.

(21) Appl. No.: 14/278,917

(22) Filed: May 15, 2014

(65) Prior Publication Data
US 2015/0330061 A1 Nov. 19, 2015

(51) Int. Cl.
  *E02F 9/28* (2006.01)
  *A01B 76/00* (2006.01)

(52) U.S. Cl.
  CPC ............ *E02F 9/2883* (2013.01); *A01B 76/00* (2013.01); *E02F 9/2841* (2013.01)

(58) Field of Classification Search
  CPC .............. E02F 9/28; E02F 9/2883; E02F 9/2825; E02F 9/2858; E02F 9/2841; A01B 76/00
  See application file for complete search history.

(56) References Cited

U.S. PATENT DOCUMENTS

| | | | | |
|---|---|---|---|---|
| 3,860,209 A | * | 1/1975 | Strecker | B60P 7/13 |
| | | | | 24/265 CD |
| 4,716,666 A | * | 1/1988 | Potter | E02F 3/401 |
| | | | | 172/719 |
| 4,995,176 A | * | 2/1991 | Briscoe | E02F 3/8152 |
| | | | | 172/751 |
| 5,005,304 A | * | 4/1991 | Briscoe | E02F 9/28 |
| | | | | 172/751 |
| 5,241,765 A | | 9/1993 | Jones et al. | |
| 5,564,508 A | * | 10/1996 | Renski | E02F 9/2883 |
| | | | | 172/772 |
| 5,666,748 A | | 9/1997 | Emrich et al. | |
| 5,913,605 A | * | 6/1999 | Jusselin | E02F 9/28 |
| | | | | 172/772 |
| 5,937,549 A | | 8/1999 | Bender et al. | |
| 6,194,080 B1 | | 2/2001 | Stickling | |
| 6,393,739 B1 | | 5/2002 | Shamblin et al. | |
| 7,144,183 B2 | * | 12/2006 | Lian | E02F 9/2841 |
| | | | | 172/772 |
| 8,336,233 B1 | * | 12/2012 | Lombardo | E02F 9/2883 |
| | | | | 172/719 |
| 8,356,432 B2 | | 1/2013 | Carpenter | |
| 8,561,326 B2 | * | 10/2013 | Ruvang | E02F 3/401 |
| | | | | 37/452 |
| 2006/0225313 A1 | | 10/2006 | McClanahan et al. | |

\* cited by examiner

*Primary Examiner* — Jamie L McGowan
(74) *Attorney, Agent, or Firm* — Leydig, Voit & Mayer, Ltd.

(57) ABSTRACT

A wear member of a mechanically attached wear plate system having a mounting base for attachment to a wear surface and a retainer member adapted to retain the wear member in an engaged position on the mounting base. The wear member is coupled to the mounting base by a rotary movement to engage an engagement surface of a dovetail flange extending from a wear member mounting side with a mounting base engagement surface. Abutment surfaces of the wear member and mounting base are disposed abutting opposite sides of the retainer member positioned in the retainer opening of the mounting base.

18 Claims, 12 Drawing Sheets

REPLACEABLE WEAR MEMBER AND REPLACEABLE WEAR MEMBER SYSTEM

TECHNICAL FIELD

This patent disclosure relates generally to a replaceable wear member and more particularly to a system for attaching the replaceable wear member to a parent member of an earthmoving machine.

BACKGROUND

Work surfaces of tools, such as buckets, are prone to excessive abrasive wear. In order to minimize wear on the structure itself, replaceable wear members are sometimes coupled to the structure along areas encountering high abrasion. Such replaceable wear members may be retained by a variety of fastening methods.

For example, welding has been frequently used to attach wear members; however, welding is expensive and time consuming. Moreover, removal and replacement of the welded wear member is an equally expensive and time-consuming task. Various types of mechanical fasteners have also been used, but with varying degrees of success because of their complexity, unreliability and cost. U.S. Pat. No. 5,937,549 to Bender et al. discloses a wear member that is slidably coupled to a mounting base that is secured to the tool surface.

SUMMARY

The disclosure describes, in one aspect, a wear member of a mechanically attached wear plate system. The mechanically attached wear plate system includes a retainer member and mounting base attached to a wear surface of a parent member. The wear member includes a mounting side adapted to be disposed adjacent the mounting base, and a wear-exposed side opposite said mounting side. The wear member further includes a retainer passage extending from the wear exposed side to the mounting side. The wear member further includes at least a first dovetail flange extending from the mounting side and including at least one wear member engagement surface. The wear member further includes at least a first wear member abutment surface substantially adjacent the retainer passage. The wear member engagement surface includes an undercut such that the dovetail flange increases in size from the mounting side of the wear member.

The disclosure further describes, in another aspect, a mechanically attached wear plate system including the above wear member, a mounting base, and a retainer member.

The disclosure describes, in yet another aspect, a mounting base for a mechanically attached wear plate system. The mounting base is adapted to be attached to a wear surface of a parent member and couple a replaceable wear member thereto. The mounting base includes a substantially disc-shaped body having a mounting surface, an outward surface disposed opposite the mounting surface, and a substantially annular outer peripheral surface extending between the mounting surface and the outward surface. The mounting base further includes a retainer opening in the outward surface. The retainer opening has opposed sides, and opposed ends extending between the opposed sides. At least first and second mounting base abutment surfaces are disposed along the opposed sides, and at least first and second engagement recesses are provided within the opposed sides, respectively. The first and second engagement recesses include at least one undercut surface.

BRIEF DESCRIPTION OF THE DRAWING(S)

DETAILED DESCRIPTION

Figure 1:
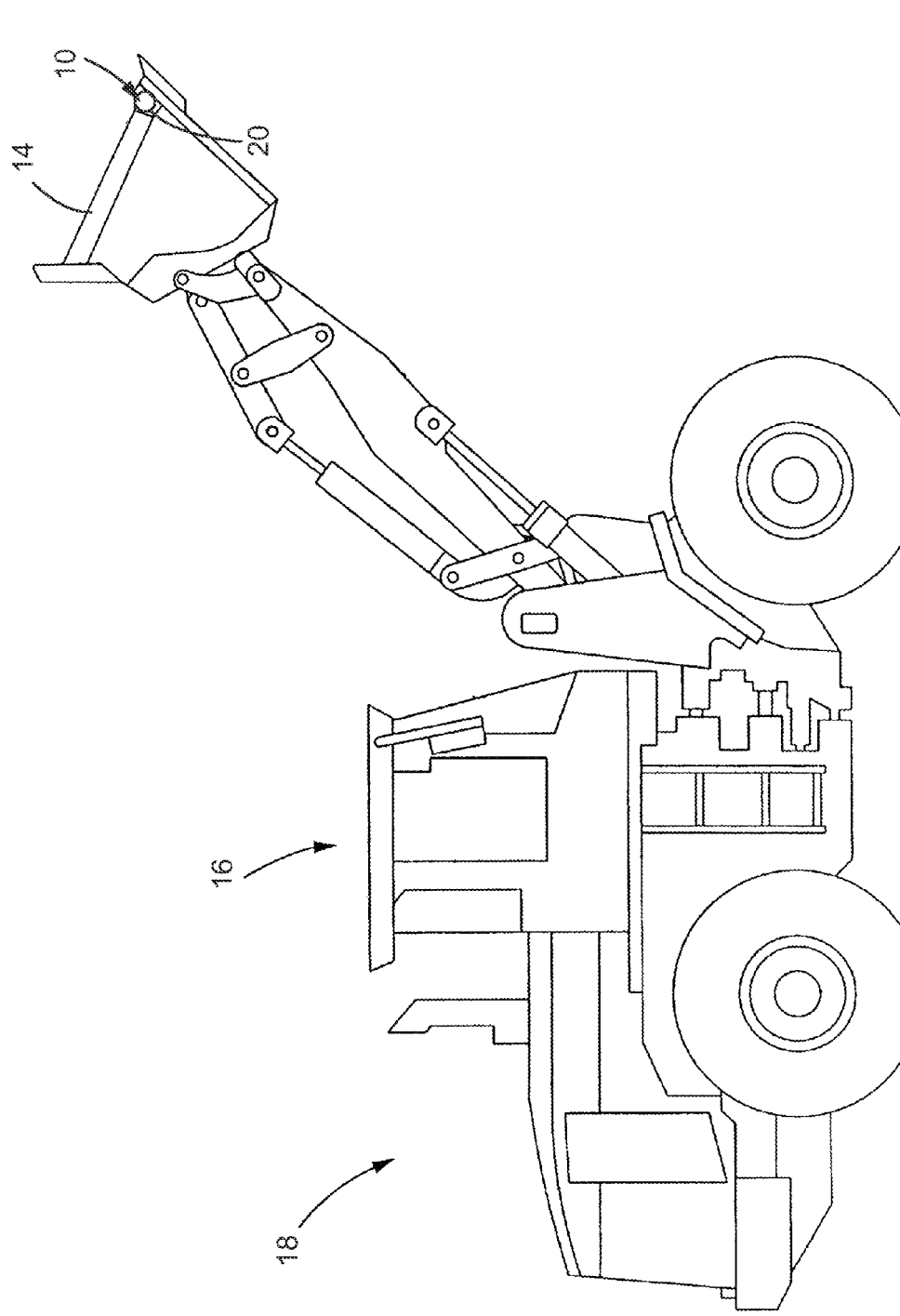
FIG. 1 is a side elevational view of an exemplary machine incorporating a wear plate system according to aspects of the present disclosure.

This disclosure relates to a wear plate system (generally shown at 10) detachably mounting a wear member 12 to a parent member 14 of an earthmoving machine 16 (see FIG. 1). While the system 10 is illustrated in connection with a front end loader 18, the arrangement disclosed herein has universal applicability in various other types of machines 16 as well. The term "machine" may refer to any machine that performs some type of operation associated with an industry such as mining, construction, farming, transportation, or any other industry known in the art. For example, the machine may be an excavator, dump truck, or other earthmoving machine. The parent member 14 may be any associated structure wherein a wear member 12 includes an edge or wear surface 20 that is subject to wear or abrasion during use. By way of example only, the wear member 12 may be the edge of a cargo bay in a dump truck or one or more implements that may be connected to the machine 16. Such implements may be utilized for a variety of tasks, including, for example, brushing, compacting, grading, lifting, loading, plowing, ripping, and include, for example, augers, blades, breakers/hammers, brushes, buckets, compactors, cutters, forked lifting devices, grader bits and end bits, grapples, blades, rippers, scarifiers, shears, snow plows, snow wings, and others. For example, a plurality of wear members 12 may be attached to a bucket such as the one illustrated in FIG. 1 by way of the wear plate system 10. Typically, such wear members are attached to one or more of the side, bottom, inside or other wear surface or cutting edge of a bucket.

Figure 2:
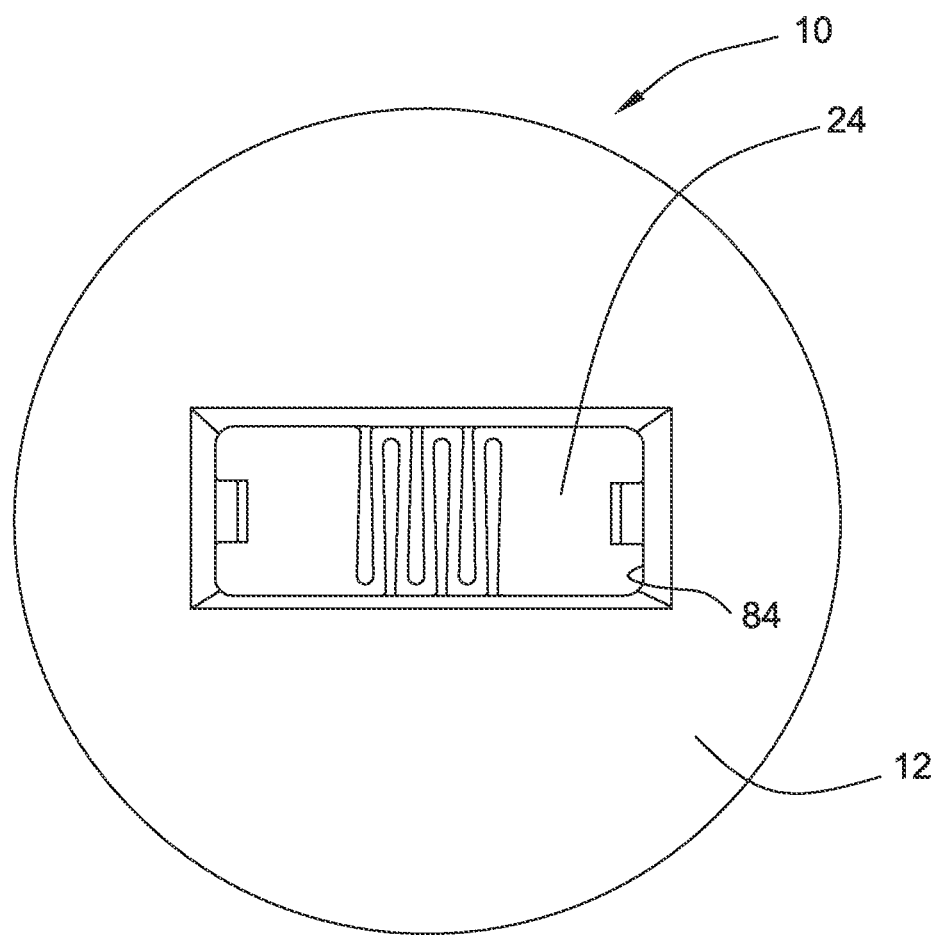
FIG. 2 is a top plan view of an exemplary wear plate system according to aspects of the present disclosure.
Figure 3:
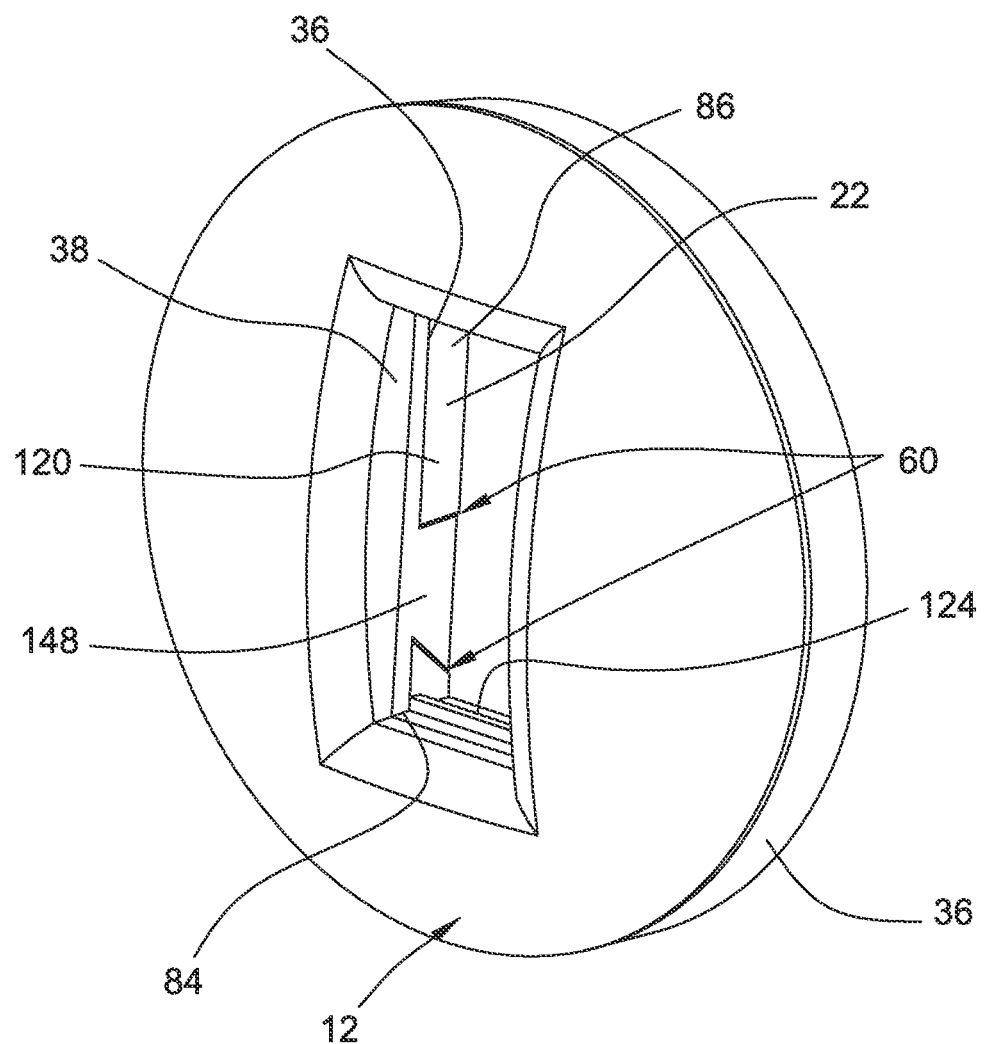
FIG. 3 is an isometric view from the top and side of the wear plate system of FIG. 2 with the retainer member removed.
Figure 4:
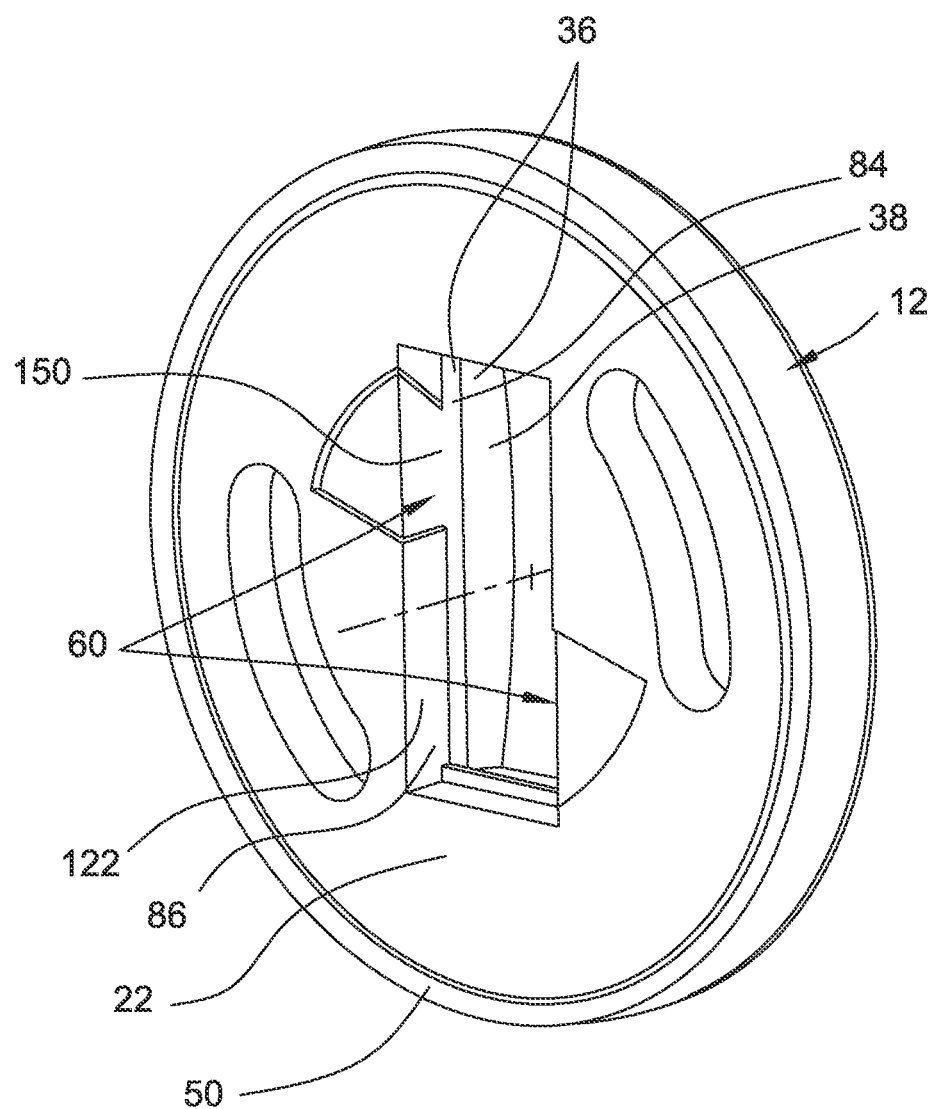
FIG. 4 is an isometric view from the bottom and side of the wear plate system of FIGS. 2-3 with the retainer member removed.

An enlarged view of the wear plate system 10 is illustrated in FIG. 2 in assembled form, and in the partially disassembled views of FIGS. 3-4. For the purposes of this disclosure, the various elements of the wear plate system 10 may be described with respect to a longitudinal plane 21 extending at a normal angle out of the wear plate system 10 as illustrated in FIG. 2. The wear plate system 10 includes a mounting base 22 secured to the parent member 14, a replaceable wear member 12 coupled to the mounting base 22, and a retainer member 24 retaining the mounting base 22 and the wear member 12 in their coupled position.

Figure 5:
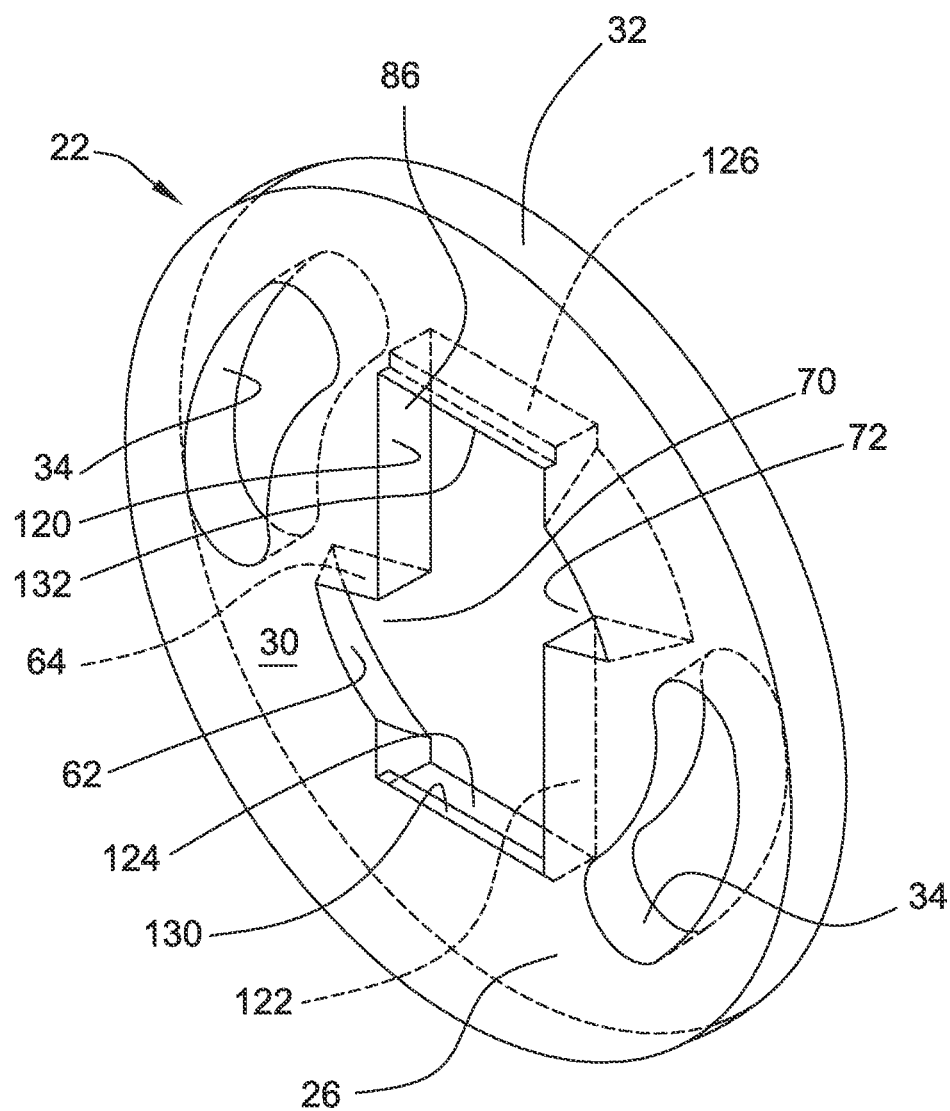
FIG. 5 is an isometric view from the top and side of an exemplary mounting base of the wear plate system of FIGS. 2-4.
Figure 6:
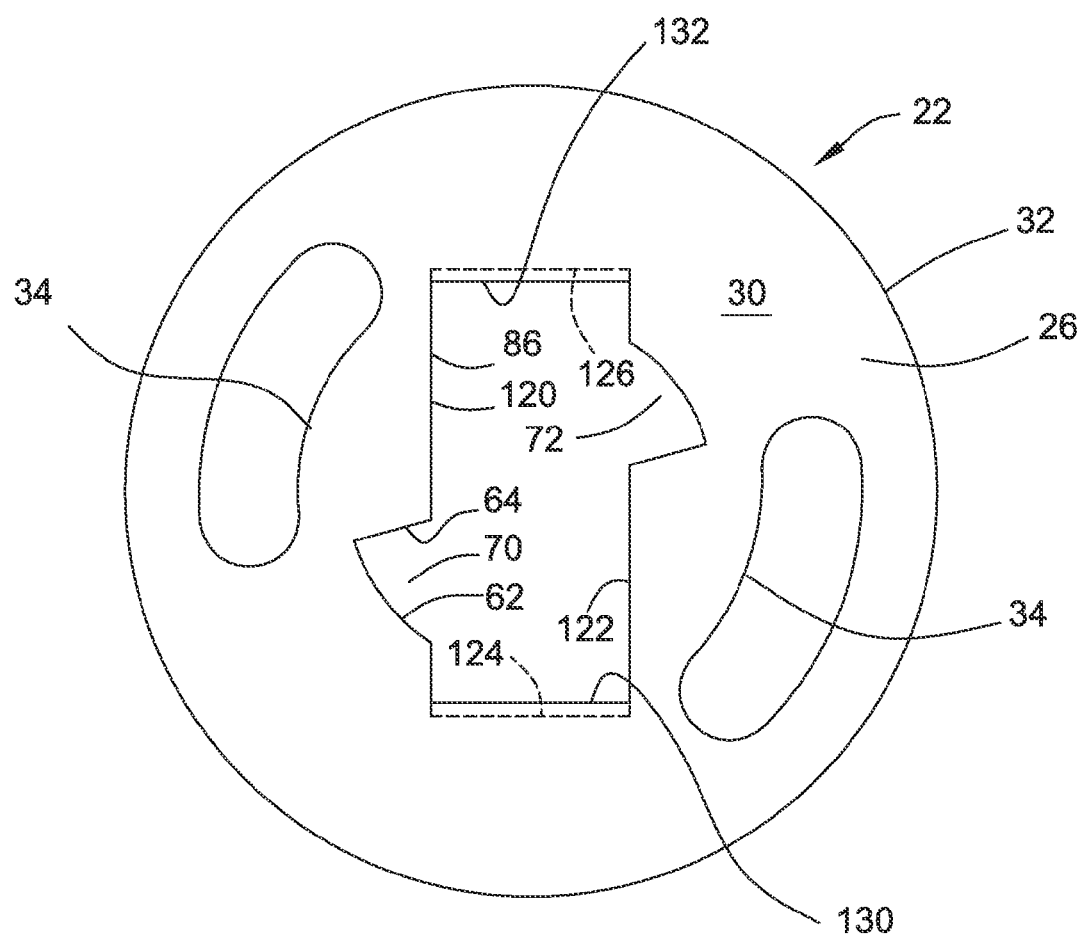
FIG. 6 is a top plan view of the mounting base of FIG. 5.
Figure 7:
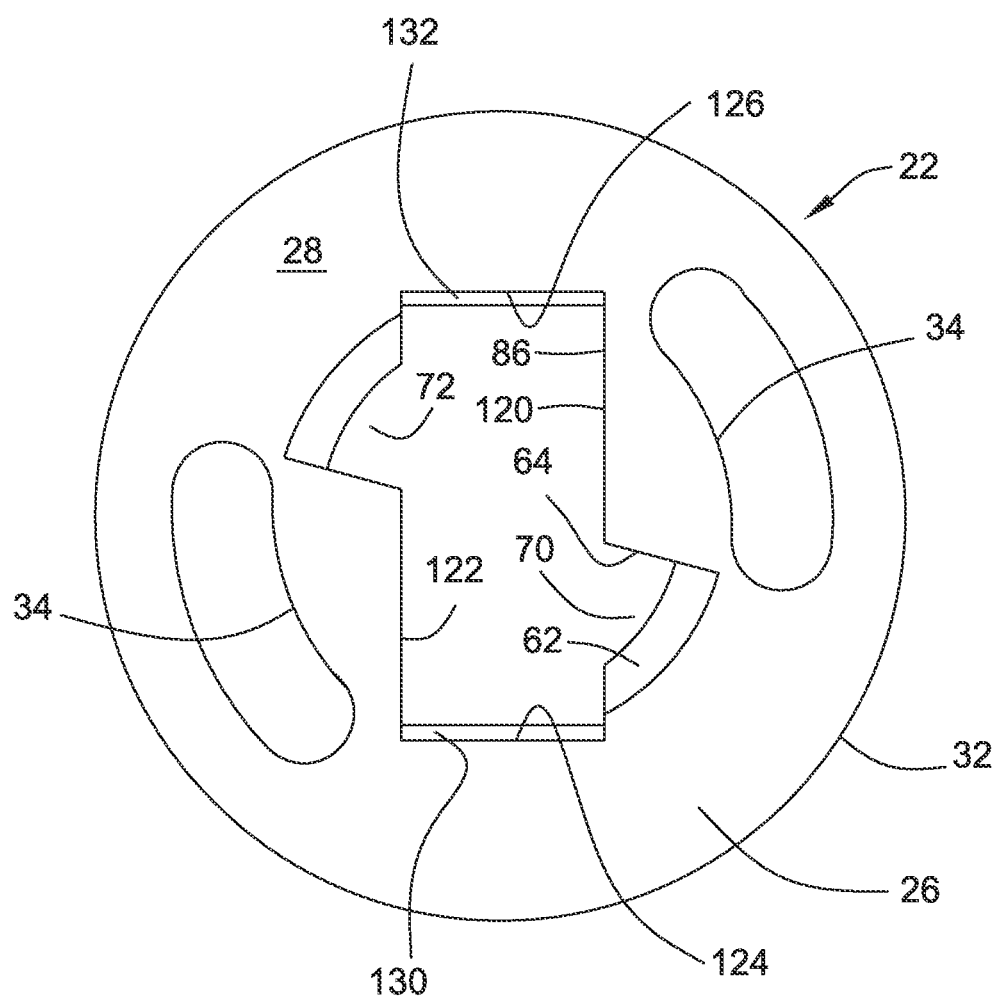
FIG. 7 is a bottom view of the mounting base of FIGS. 5-6.

Isometric, and top and bottom plan views of the mounting base 22 are provided in FIGS. 5-7. The mounting base 22 includes a body portion 26 having a mounting surface 28 (see FIG. 7) that is adapted to be disposed adjacent the wear surface 20 of the parent member 14. Opposite the mounting surface 28, the body portion 26 includes an outward surface 30 (see FIGS. 5-6). The illustrated mounting base 22 has a substantially annular disc-like shape with an outer peripheral surface 32.

For the purposes of this disclosure, the term "substantially annular" means that the generally circular, although not necessarily forming a perfect circle. Also, for the purposes of this disclosure, the term "disc-like" means relatively flat, as opposed to significantly arched, as would be the case with a segment of a sphere or a hemispherical structure.

The mounting base 22 may be secured to the wear surface 20 of the parent member 14 by any appropriate method that provides a relatively permanent connection between the mounting base 22 and the wear surface 20. In at least one embodiment, the mounting base 22 is welded to the wear surface 20. In order to facilitate welding the mounting base 22 to the wear surface 20, the mounting base 22 may include one or more welding slots 34. In the illustrated embodiment, two elongated welding slots 34 are provided, although an alternate number and shape of welding slots 34 may be provided, depending upon the structure of the mounting base 22 including, for example, the cooperating elements for engagement with wear member 12 or the retainer member 24, both discussed further below. Those of skill will appreciate that the welding slots 34 may provide enhanced heat distribution and increased welding surface area, as well as a location for placement of welding material during the welding process.

Returning now to FIGS. 2-4, the wear member 12 has a mounting side 42 adapted for coupling to the mounting base 22 and a wear exposed side 44. The mounting side 42 is adapted to be disposed adjacent the outward surface 30 of the mounting base 22, and includes cooperating elements for engagement with the mounting base 22, as will be explained in greater detail below. The wear exposed side 44 may present any appropriate surface. The domed surface illustrated, for example may assist in deflecting debris.

Figure 14:
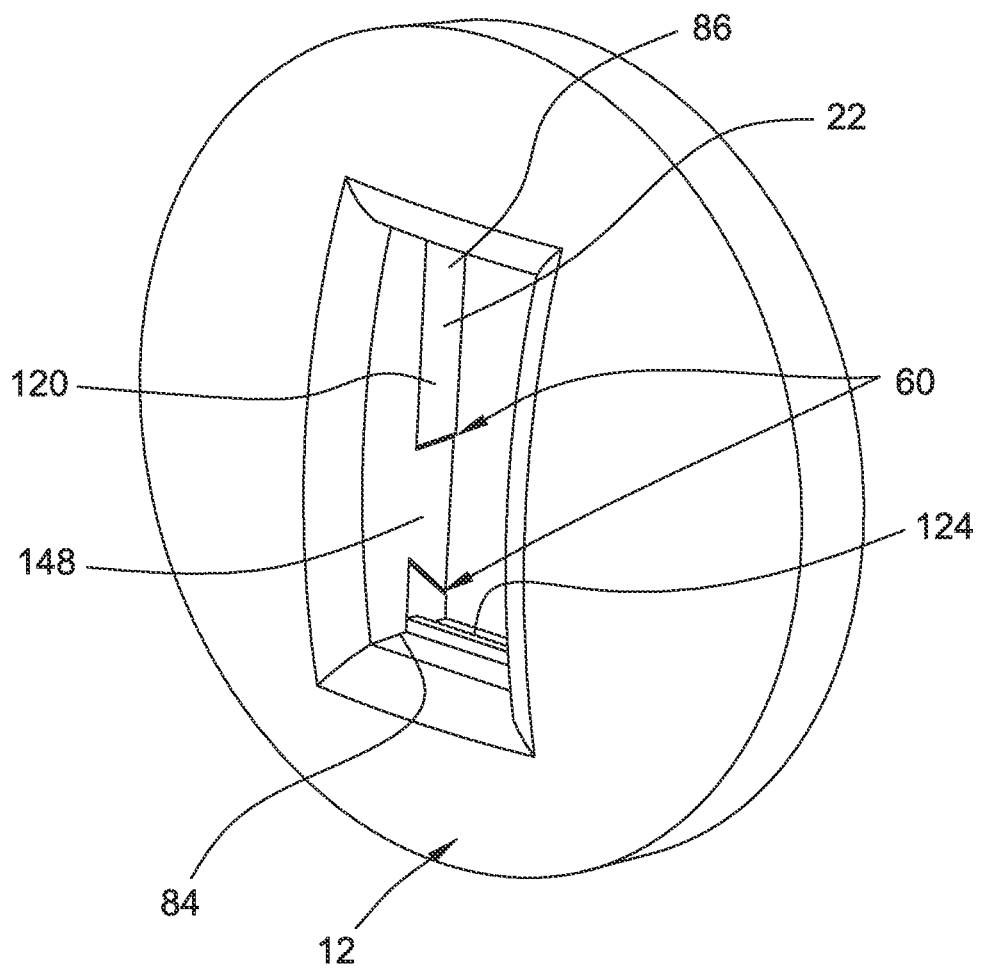
FIG. 14 is an isometric view from the top and side of an alternate embodiment of the wear plate system with the retainer member removed.

While the wear member 12 may be formed as a unitary piece, the wear member 12 may alternately be formed of a plurality of members, and may be fabricated by any appropriate method. When formed as a unitary member, the wear member 12 may be cast or otherwise fabricated as a single piece, as shown, for example, in FIG. 14.

In the embodiment illustrated in FIGS. 3-4, the wear member 12 includes a wear member base 36 and an outward wear member 38. When formed as a multipiece structure, the wear member base 36 presents the mounting side 42 of the wear member 12, while the outward wear member 38 presents the wear exposed side 44. The outward wear member 38 and wear member base 36 may be formed of the same or different materials. For example, the outward wear member 38 may be formed of a harder material, such as "white iron," which has a higher hardness, but can be more brittle, while the wear member base 36 may be formed of a stronger material to provide strong cooperating elements for engagement with the mounting base 22. The outward wear member 38 and the wear member base 36 may be separately cast or fabricated, and then joined in a separate operation; for example, they may be welded or brazed together. Alternately, one of the outward wear member 38 or the wear member base 36 may be cast to the other during fabrication.

Similar to the mounting base 22, the wear member 12, whether formed as a unitary structure or a multipart structure including a wear member base 36 and the outward wear member 38, has a substantially annular disc-like shape with an outer peripheral surface 46. The wear member 12 further defines an axis 48, the significance of which will become clear upon further explanation.

Figure 8:
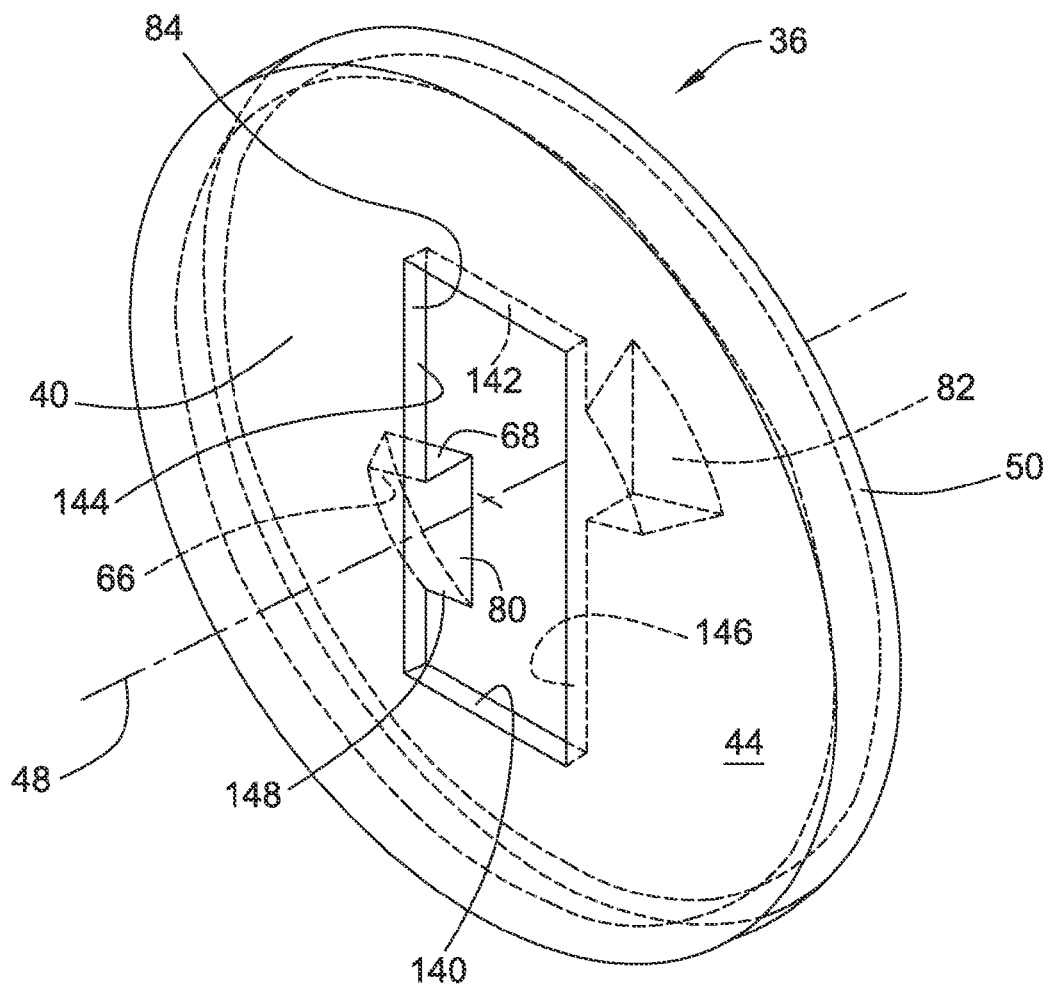
FIG. 8 is an isometric view from the top and side of an exemplary wear member of the wear plate system of FIGS. 2-4.
Figure 9:
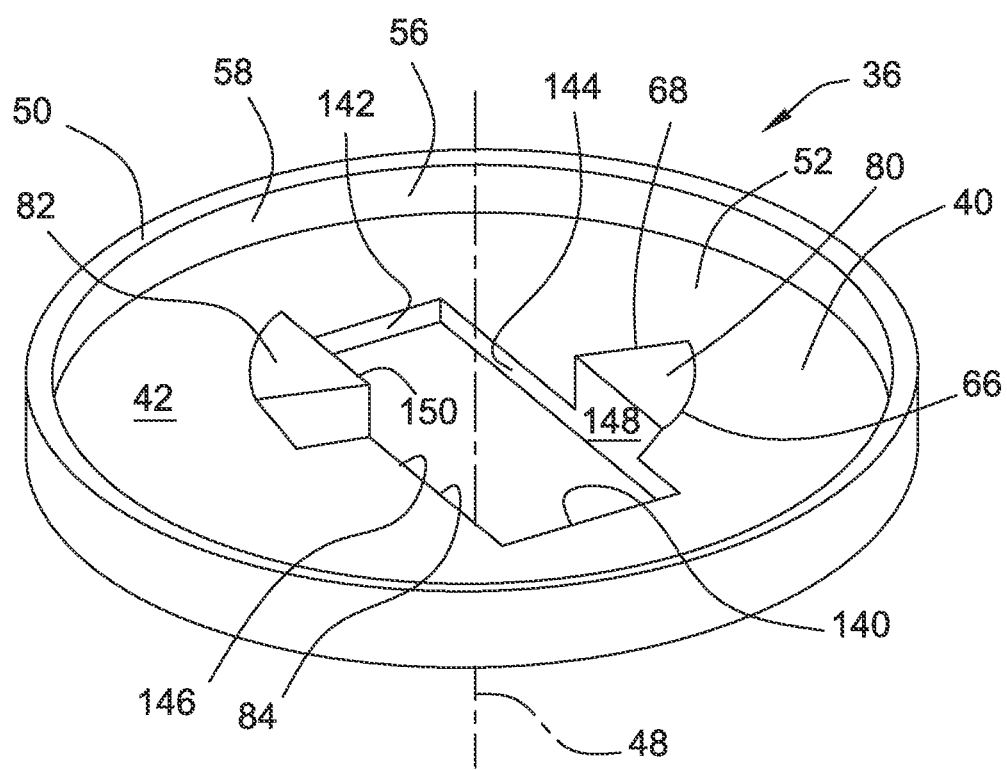
FIG. 9 is an isometric view from the bottom and side of the wear member of FIG. 8.
Figure 10:
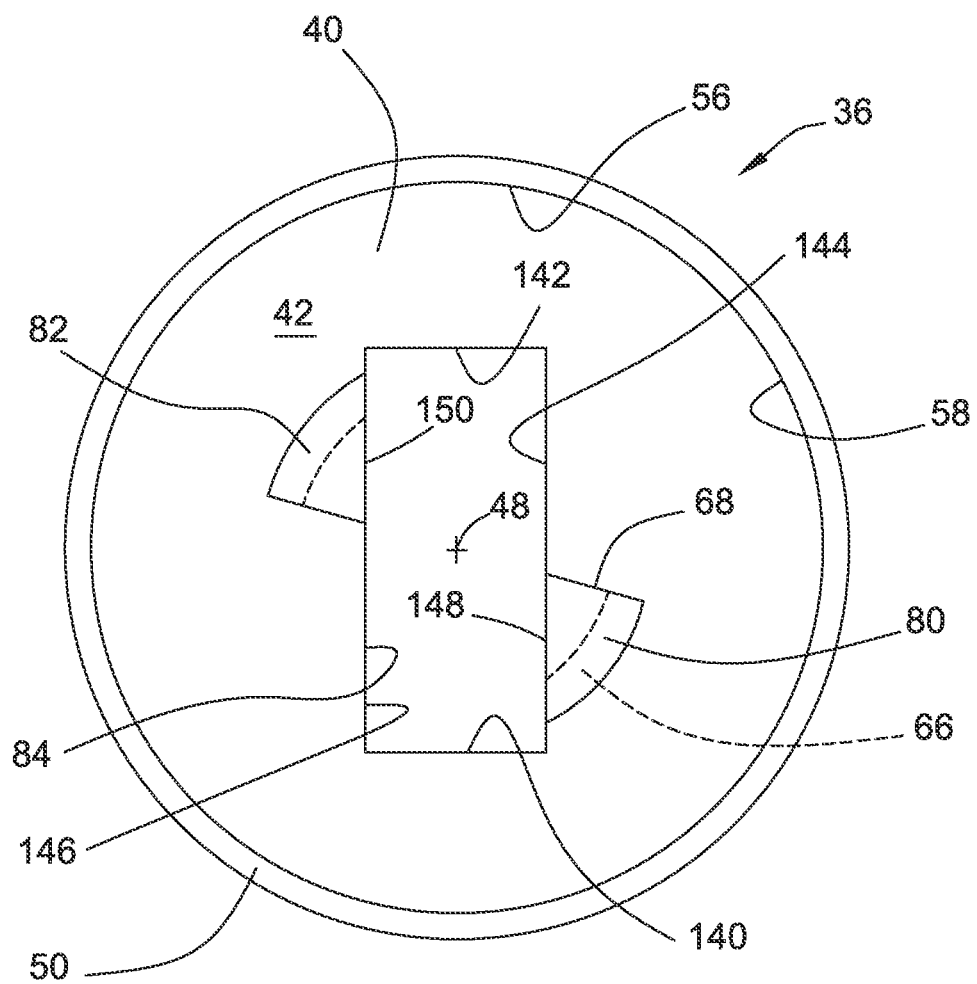
FIG. 10 is a bottom view of the wear member of FIGS. 8-9.

Turning now to the FIGS. 8-10, top and bottom isometric views, and a bottom plan view of the wear member base 36 of the wear member 12 are illustrated. The wear member base 36 includes a body portion 40 having an outward surface 41 opposite the mounting side 42 of the wear member base 36. The outward surface 41 of the wear member base 36 is adapted to be secured with an inward surface 39 of the outward wear member 38, as described above.

In order to minimize the opportunity for dirt and abrasive materials to enter into the space between the wear member 12 and the mounting base 22, the wear member 12 may include an apron 50 depending from the mounting side 42 of the wear member base 36, about the periphery of the body portion 40. The apron 50 and the mounting side 42 of the wear member base 36 form a mounting base receiving pocket 52. The contours of the mounting base receiving pocket 52 may be such that they closely follow the contours of the outward surface 30 of the mounting base 22, as may be seen, for example, in FIGS. 3 and 4. The apron 50 may have a height such that, when the wear member 12 is mounted to the mounting base 22, the lower edge 54 of the apron 50 is disposed substantially adjacent the wear surface 20 of the parent member 14, minimizing the opportunity for dirt or other abrasive materials to enter any space between the wear member 12 and the mounting base 22 from the outer periphery.

The apron 50 may also assist in placement of the wear member 12 on the mounting base 22. To this end, the apron 50 includes at least one guide surface 56 along the mounting side 42 of the wear member 12. The guide surface 56 is disposed substantially adjacent the outer peripheral surface 32 of the mounting base 22 when the wear member 12 is placed on the mounting base 22. As the wear member 12 is rotated on the mounting base 22, as will be explained in greater detail below, the guide surface 56 moves along the outer periphery of the mounting base 22. It will be appreciated that the guide surface 56 may be coincident with an inside wall 58 of the apron 50, such as the illustrated substantially annular inside wall 58 of the apron 50. Alternately, a plurality of guide surfaces 56 may be provided as, for example, with an undulating inside wall or plurality of protrusions (not illustrated).

In order to properly position and couple the wear member 12 to the mounting base 22, cooperating place and rotate elements are provided on the wear member 12, here, the wear member base 36, and mounting base 22 (shown generally as 60 in FIGS. 3 and 4). More specifically, the mounting base 22 includes at least one mounting base engagement surface 62, 64 and the wear member 12, here, the wear member base 36, is provided with at least one wear member engagement surface 66, 68. As the wear member 12 is initially placed on the mounting base 22, the mounting base and wear member engagement surfaces 62, 64, 66, 68 are disposed in an unlocked position. As the wear member 12 is rotated relative to the mounting base 22 about axis 48, and the mounting base and wear member engagement surfaces 62, 64, 66, 68 engage to couple the wear member 12 to the mounting base 22.

As may be seen in FIGS. 5 and 7, in the illustrated embodiment, the mounting base 22 includes first and second mounting base engagement surfaces 62, 64 along first and second engagement recesses 70, 72. Similarly, as may be seen in FIGS. 8-10, the wear member 12 includes first and second wear member engagement surfaces 66, 68 along first and second flanges 80, 82, here, first and second dovetail flanges 80, 82. Each of the first and second engagement recesses 70, 72 has a substantially triangular shape with an open side and the first and second dovetail flanges 80, 82 have a generally triangular shape increasing in size as they extend from the mounting side 42 of the wear member 12 in this embodiment. Alternate shapes may be provided.

In coupling the wear member 12 to the mounting base 22, first and second dovetail flanges 80, 82 are positioned in substantially the same plane with the first and second engagement recesses 70, 72. The wear member 12 is then rotated about the axis 48 to rotate engagement first wear member engagement surfaces 66 along the first mounting base engagement surfaces 62 into an engagement position wherein the second wear member engagement surfaces 68 abut and engage the second mounting base engagement surfaces 64.

In order to provide an interlocking between the wear member 12 and the mounting base 22, the first and second mounting base engagement surfaces 62, 64 are undercut relative to the outward surface 30 of the mounting base 22. That is, the first and second engagement recesses 70, 72 are undercut relative to the outward surface 30 against which the wear member 12 is disposed. Likewise, the first and second wear member engagement surfaces 66, 68 are undercut relative to the mounting side 42 of the wear member 12, here, the wear member base 36, i.e., the first and second wear member engagement surfaces 66, 68 are disposed at an acute angle to the mounting side 42 of the body portion 40. That is, the first and second dovetail flanges 80, 82 increase in size as they rise from the mounting side 42 of the body portion 40, which is disposed adjacent the outward surface 30 of the mounting base 22 in an assembled wear plate system 10. In this way, the first and second dovetail flanges 80, 82 are, in essence, generally triangularly-shaped keys that engage the first and second engagement recesses 70, 72 of the mounting base 22.

In order to enable the wear member 12 to be coupled to the mounting base 22 as a result of the rotation of the wear member 12 relative to the mounting base 22, the first mounting base and wear member engagement surfaces 62, 66 are arcuate surfaces such that they interlock as the first wear member engagement surfaces 66 slide over the first mounting base engagement surfaces 62. While the arcs of the first mounting base and wear member engagement surfaces 62, 66 are disposed at substantially uniform distances, respectively, from the axis 48, they may be alternately formed. In contrast, the second mounting base and wear member engagement surfaces 64, 68 of this embodiment are disposed generally radially relative to the axis 48. As with the first mounting base and wear member engagement surfaces 62, 66, the second mounting base and wear member engagement surfaces 64, 68 may be alternately disposed. It will be appreciated, however, that the interlocking between the engagement surfaces 62, 64, 66, 68 in conjunction with the overall designs of the wear member 12 and the mounting base 22 must be sufficient to provide a secure coupling of the components.

The number, positioning, shape, and size of the engagement recesses 70, 72 and the dovetail flanges 80, 82 along with their associated surfaces may be other than the plurality illustrated, so long as at least one dovetail flange having at least one wear member engagement surface and at least one recess having at least one mounting base engagement surface are provided. Thus, while the illustrated mounting base 22 and wear member 12 include two pairs of mounting base and wear member engagement surfaces, any appropriate number may be utilized, although the number may be dependent upon the structure of the respective components.

Figure 11:
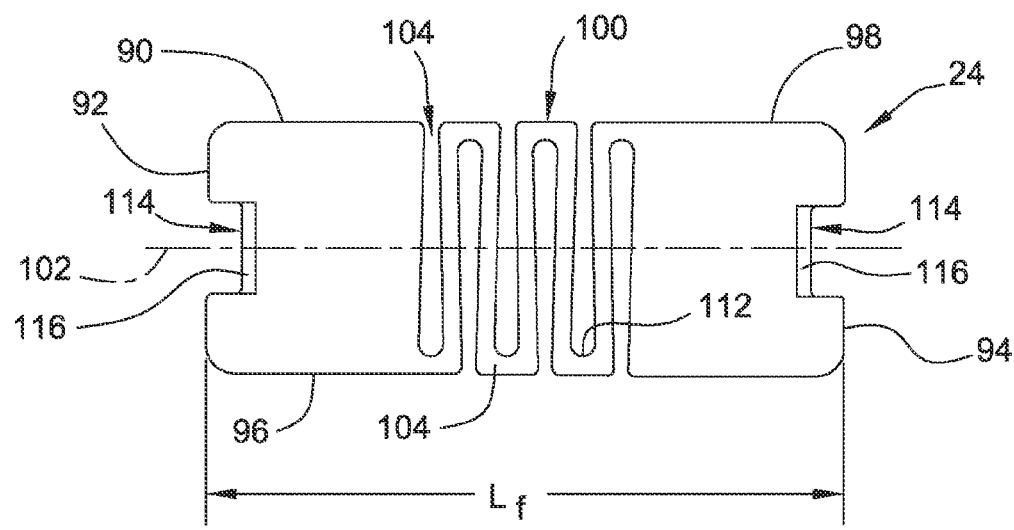
FIG. 11 is a top plan view of an exemplary retainer member of the wear plate system of FIGS. 2-3 shown at its predetermined free-length configuration.
Figure 12:
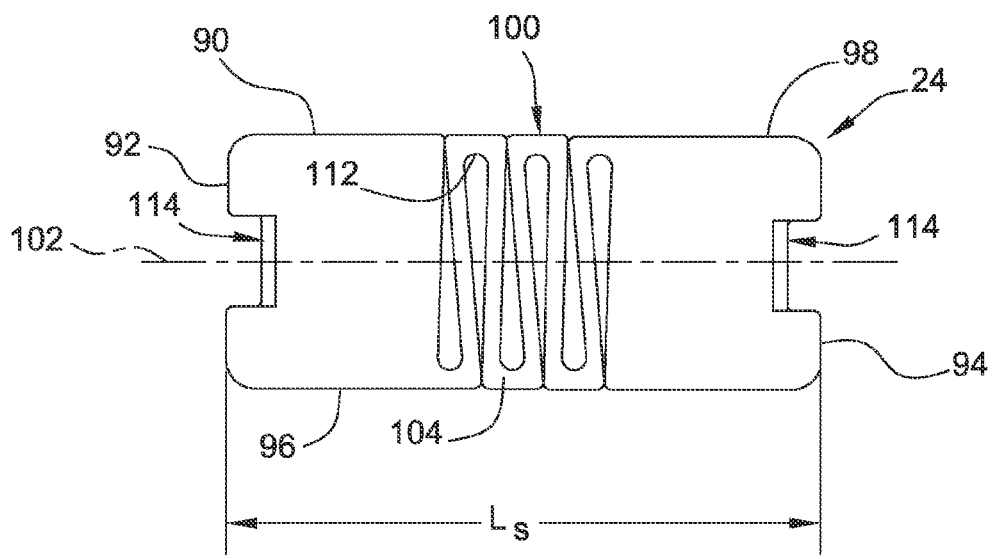
FIG. 12 is a diagrammatic top view of the retainer member of FIG. 11 shown at its predetermined shorter compressed length configuration.
Figure 13:
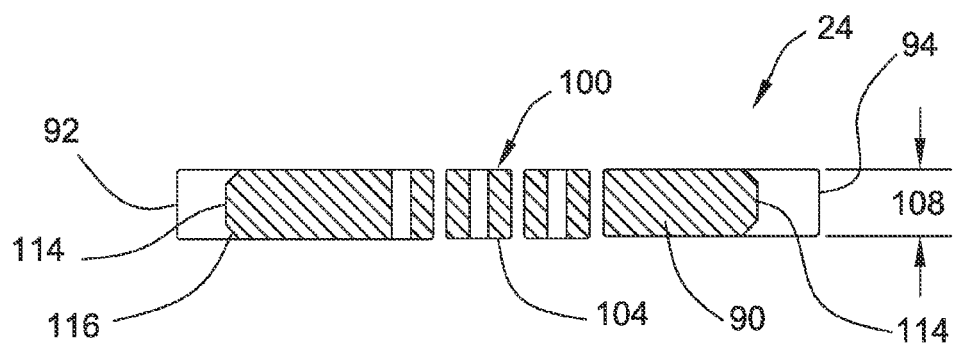
FIG. 13 is a cross-sectional view of the retainer member of FIGS. 11 and 12 taken along line 13-13 in FIG. 11.

In order to maintain the wear member 12 in an engaged position on the mounting base 22, retainer member 24 is received in a retainer passage 84 in the wear member 12 and a retainer opening 86 in the mounting base 22. An exemplary retainer member 24 is illustrated in FIGS. 11-13. The retainer member 24 has a generally flat body portion 90 which is adapted for placement within the retainer opening 86 of the mounting base 22. The body portion 90 includes a pair of opposite ends 92, 94 along a pair of opposed retainer member sides 96, 98. The body is preferably constructed of steel, but may be made of any suitable substantially non-compressible material, which is well known in the art. The retainer member 24 is also provided with a convoluted spring portion 100 along the body portion 90. The convoluted spring portion 100 is adapted to provide the body portion 90 with sufficient resiliency from end to end along its longitudinal axis 102 to permit the length of the body portion 90 to be changed from a predetermined free length "$L_f$" from end to end to a shorter compressed length "$L_s$" when a compressive force is applied to the ends 92, 94 of the body. That is, the retainer member 24 may be moved between an expanded position shown in FIG. 11 to a compressed position shown in FIG. 12. The convoluted spring portion 100 is sufficiently rigid, however, to enable the retainer member 24 to withstand compressive loads applied to the sides of the retainer member 24 without incurring any significant distortion.

The convoluted spring portion 100 has a convolute 104 that runs back and forth from one retainer member side 96 of the retainer member to the other retainer member side 98 thereof as it progresses along the longitudinal axis 102. The convolute 104 is formed by a plurality of interleaved slots 106 cut into the body portion 90 and extending in alternating fashion from each of the retainer member sides 96, 98 toward the other of the retainer member sides 96, 98.

In the embodiment of the retainer member 24 shown in FIGS. 11-13, the interleaved slots 106 are somewhat teardropped in shape, with a radiused end 112 to reduce bending stresses when the retainer member is compressed. Each of the opposite ends 92, 94 are preferably provided with a pry tool notch 114 with a beveled bottom 116 adapted to allow the insertion of a pry tool, such as a flat bladed screw driver, for compressing the retainer member for removal purposes. Alternate embodiments of the retainer member 24 may be utilized.

Turning back to FIGS. 5-7, the mounting base 22 includes retainer opening 86 through at least the outward surface 30 of the body portion 26. The retainer opening 86 includes first and second mounting base abutment surfaces 120, 122 along opposed sides of the retainer opening 86, the first and second engagement recesses 70,72 forming notches in otherwise continuous mounting base abutment surfaces 120, 122. The retainer opening 86 additionally includes first and second mounting base retaining surfaces 124, 126 at opposite ends of the retainer opening 86 between the first and second mounting base abutment surfaces 120, 122. When the retainer member 24 is inserted into the retainer opening 86 of the mounting base 22, the opposed retainer member sides 96, 98 are disposed adjacent the first and second mounting base abutment surfaces 120, 122, with the opposite ends 92, 94 of the retainer member 24 are disposed adjacent the first and second mounting base retaining surfaces 124, 126.

In order to further retain the retainer member 24 within the retainer opening 86, at least one catch elements 130, 132 may be provided adjacent the first and second mounting base retaining surfaces 124, 126. Here a plurality of catch elements, including first and second catch elements 130, 132, is provided. The catch elements 130, 132 may be of any appropriate design. In this embodiment, the catch elements 130, 132 are formed by as opposed inwardly extending flanges on each of the opposed first and second mounting base retaining surfaces 124, 126. When the retainer member 24 is disposed within the retainer opening 86, the catch elements 130, 132 may be positioned along an upper surface of the retainer member 24 at its opposite ends 92, 94 to maintain the retainer 24 in position. Thus, the thickness 108 of the retainer member 24 is no greater than the first and second mounting base retaining surfaces 124, 126. While two catch elements 130, 132 are illustrated in this embodiment, it will be appreciated that additional catch elements may be provided.

Turning now to FIGS. 8-10, the wear member 12 similarly includes retainer passage 84, which allows the retainer 24 to be placed in position within the retainer opening 86 of the mounting base 22. In the illustrated embodiment, both the wear member base 36 and outward wear member 38 include the retainer passage 84. The retainer passage 84 is provided through the wear member 12, extending from the wear exposed side 44 into the mounting base receiving pocket 52. The retainer passage 84 has opposite ends 140, 142 extending transversely to the longitudinal plane 21, and opposed sides 144, 146 extending between the opposite ends 140, 142.

Thus, when the wear member 12 is assembled to the mounting base 22 and rotated into engagement, as illustrated in FIGS. 3 and 4, the retainer member 24 may be moved to the compressed position and assembled through the retainer passage 84 of the wear member 12 and into the retainer opening 86 of the mounting base 22. In doing so, one end 92, 94 of the retainer member 24 may first be assembled through the retainer passage 84 and situated subjacent one of the catch elements 130, 132 within the retainer opening 86 of the mounting base 22. A pry tool or the like may then be engaged with the pry tool notch 114 of the retainer member 24 to compress the retainer member 24 from the free position illustrated in FIG. 11 to the shortened, i.e., compressed position illustrated in FIG. 12, to allow the opposite end 92, 94 of the retainer member 24 to situated subjacent the other of the catch elements 130, 132. As the retainer member 24 is released to allow it to return to its free position, the opposite ends 92, 94 of the retainer member bear against the first and second mounting base retaining surfaces 124, 126, held in place by the catch elements 130, 132.

It will further be noted that the opposed sides 144, 146 of the retainer passage 84 of the wear member 12 extend not only along the body portion 40 of the wear member base 36, but also along the first and second dovetail flanges 80, 82, forming first and second wear member abutment surfaces 148, 150. As may best be seen in FIGS. 3 and 4, when the wear member 12 is engaged with the mounting base 22, the first and second wear member abutment surfaces 148, 150 of the first and second dovetail flanges 80, 82 form substantially contiguous abutment surfaces with the first and second mounting base abutment surfaces 120, 122. Thus, when the retainer member 24 is disposed within the retainer opening 86 of the mounting base 22 when the wear member 12 is engaged with the mounting base 22, the first and second mounting base abutment surfaces 120, 122, as well as the first and second wear member abutment surfaces 148, 150 of the first and second dovetail flanges 80, 82 are disposed along opposed retainer member sides 96, 98 of the retainer member 24. As a result, with the retainer member 24 inserted into the retainer opening 86 of the mounting base 22, the retainer member 24 maintains the wear member 12 and the mounting base 22 in their relative, engaged positions, preventing the wear member 12 from rotating out of the engagement position with the mounting base 22.

INDUSTRIAL APPLICABILITY

The present disclosure is applicable to earthmoving machines 16 including a parent member 14 having one or more edges or wear surfaces 20 that are subject to wear or abrasion during use. One or more embodiments of the disclosed wear plate system 10 may allow for the attachment of a replaceable wear member 12 to a mounting base 22 secured to the wear surface 20.

One or more embodiments may provide for the replacement of the wear member 12 without the need for large or cumbersome equipment. As a result, such replacement may be performed in the field, without dedicated equipment. For example, removal for replacement may be accomplished using a common screwdriver or small pry bar. Similarly, a common screwdriver or small pry bar may be utilized to compress the retainer member 24 for placement once a replacement wear member 12. The wear member 12 may be replaced by positioning the wear member 12 on the mounting base 22 and rotating; the retainer member 24 may then be inserted into the retainer passage 84 and positioned in the retainer opening 86. The retainer member 24 may then be partially situated and then compressed using a common screwdriver or small pry bar and pivoted into position in the mounting base 22. Thus, in some embodiments, the replacement of the wear member 12 may be performed quickly, and without dedicated equipment or maintenance personnel, minimizing downtime and maximizing equipment operational time.

Some embodiments of mounting base 22 may be easily secured to the parent surface 20 by welding, positioning welding material within provided welding slots 34 in the mounting base 22.

In some embodiments of the wear plate system 10, the wear member 12 closely follows the outside contours of the mounting base 22, providing an efficient transfer of impact forces from the wear member 12 to the mounting base 22. In some embodiments, this may minimize the opportunity for failure of the place and rotate elements 60 engaging the wear member 12 and the mounting base 22. For example, upon side impact or the application of force to the side of the wear member 12, the apron 50 transmits force to the outer peripheral surface 32 of the mounting base 22. As a result, the place and rotate elements 60 are not forced to absorb completely the lateral force, minimizing the opportunity for failure of the dovetail flanges 80, 82. In some embodiments, the substantially round shape of the wear member 12 and mounting base 22 may enhance this transmission of forces and minimize the opportunity for structural failure of the wear member 12 inasmuch as it does not include sharp corners to which a lateral force would be applied.

Some embodiments may also provide a low profile, allowing the wear plate system 10 to be utilized without significantly changing the profile of the parent member 14. The wear member 12 can be worn down further before such wear reaches the retainer member 24, allowing replacement of only the wear member 12, thus minimizing waste and thereby reducing costs.

It will be appreciated that the foregoing description provides examples of the disclosed system and technique. However, it is contemplated that other implementations of the disclosure may differ in detail from the foregoing examples. All references to the disclosure or examples thereof are intended to reference the particular example being discussed at that point and are not intended to imply any limitation as to the scope of the disclosure more generally. All language of distinction and disparagement with respect to certain features is intended to indicate a lack of preference for those features, but not to exclude such from the scope of the disclosure entirely unless otherwise indicated.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context.

Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context.

Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

I claim:

1. A wear member of a mechanically attached wear plate system including a mounting base attached to a wear surface, the wear member comprising:
   a mounting side and a wear exposed side opposite said mounting side,
   a retainer passage extending between the wear exposed side and the mounting side,
   at least a first dovetail flange extending from the mounting side and including at least one wear member engagement surface and at least a first wear member abutment surface substantially adjacent the retainer passage, the wear member engagement surface is an arcuate dovetail shape about an axis of rotation for the wear member to engage the mounting base and includes an undercut such that the dovetail flange increases in size from the mounting side of the wear member.

2. The wear member of claim 1 further including a second dovetail flange extending from the mounting side and disposed along a side of the retainer passage opposite the first dovetail flange, the second dovetail flange including at least one wear member engagement surface and at least a second wear member abutment surface substantially adjacent the retainer passage and opposite the first wear member abutment surface, the wear member engagement surface of the second dovetail flange including an undercut such that the second dovetail flange increases in size from the mounting side of the wear member.

3. The wear member of claim 2 wherein the first and second dovetail flanges each include at least two wear member engagement surfaces.

4. The wear member of claim 1 wherein the at least one dovetail flange has a substantially triangular shape.

5. The wear member of claim 1 having a substantially round disc-like shape.

6. The wear member of claim 1 wherein the wear member includes a wear member base and an outward wear member, the wear member base including the mounting side and the at least one dovetail flange, the outward wear member including the wear exposed side, the outward wear member being secured to the wear member base.

7. The wear member of claim 6 wherein the wear member base and the outward wear member are formed of different materials.

8. The wear member of claim 1 including an apron extending about a periphery of the wear member from the mounting side.

9. The wear member of claim 8 wherein the apron includes at least one guide surface.

10. The wear member of claim 9 wherein the wear member includes a wear member base and an outward wear member, the wear member base including the mounting side and the at least one dovetail flange, the outward wear member including the wear exposed side, the outward wear member being secured to the wear member base, the wear member further including a second dovetail flange extending from the mounting side and disposed along a side of the retainer passage opposite the first dovetail flange, the second dovetail flange including at least one wear member engagement surface, and including at least a second wear member abutment surface sized and disposed such that the second mounting base abutment surface and the second wear member abutment surface abut said opposite side of the retainer passage, and the guide surface of the apron including a substantially annular inside wall of the apron.

11. A mounting base for a mechanically attached wear plate system for attachment of a replaceable wear member to a wear surface of a parent member, the mounting base comprising:
   a substantially disc-shaped body, the body including
      a mounting surface,
      an outward surface disposed opposite the mounting surface, a substantially annular outer peripheral surface extending between the mounting surface and the outward surface, a retainer opening in the outward surface, the retainer opening having opposed sides, opposed ends extending between the opposed sides, at least first and second mounting base abutment surfaces along opposed sides, at least first and second engagement recesses within the opposed sides, respectively, the first and second engagement recesses including at least one undercut surface, wherein at least one of the engagement recesses includes an arcuate, dovetail-shaped surface extending from one of the opposed sides, and wherein the opposed ends of the retainer opening include first and second catch elements, respectively, and wherein each of the engagement recesses includes an undercut arcuate surface relative to a rotation axis for the wear member and an undercut generally radially disposed surface extending from the associated side of the retainer opening, the body further including at least one welding slot.

12. The mounting base of claim 11 wherein at least one end of the retainer opening includes at least a first catch element.

13. A mechanically attached wear plate system for attachment to a wear surface of a parent member of an earthmoving machine, the system comprising:

a mounting base adapted to be secured to the parent member, the mounting base including a mounting surface adapted to be disposed adjacent said wear surface of the parent member, an outward surface disposed opposite the mounting surface, a retainer opening in the outward surface, the retainer opening having opposed sides and opposed ends extending between the opposed sides, at least first and second mounting base abutment surfaces disposed along the opposed sides of the retainer opening, at least a first engagement recess from one of the sides of the retainer opening, the first engagement recess including at least a first mounting base engagement surface, a wear member adapted to be coupled to the mounting base, the wear member including a mounting side adapted to be disposed adjacent the outward surface of the mounting base, and a wear exposed side opposite said mounting side, a retainer passage extending between the wear exposed side and the mounting side, at least a first flange extending from the mounting side and including at least one wear member engagement surface, the first flange being sized to be received within the retainer opening of the mounting base and rotated into an engagement position with the first wear member engagement surface engaging the first mounting base engagement surface, the first wear member abutment surface being disposed substantially adjacent the retainer passage when the first flange is rotated into the engagement position within the first engagement recess, a retainer member having an expanded position and a compressed position, the retainer member being sized for receipt through said retainer passage and into said retainer opening when disposed in the compressed position, and engaged and retained by a catch element when disposed in the expanded position, the retainer member having opposed retainer member sides, the first and second mounting base abutment surfaces being disposed substantially adjacent the opposed retainer member sides, respectively, and the first wear member abutment surface being disposed substantially adjacent one of said opposed retainer member sides when the retainer member is received within the retainer opening.

14. The mechanically attached wear plate system of claim 13 wherein the first wear member engagement surface includes an undercut substantially arcuate surface, and the first engagement recess includes an undercut substantially arcuate surface.

15. The mechanically attached wear plate system of claim 14 wherein the wear member includes a second flange having a second wear member engagement surface including an undercut substantially arcuate surface, and the mounting base includes a second engagement recess including an undercut substantially arcuate surface.

16. The mechanically attached wear plate system of claim 13 wherein the wear member includes a wear member base and an outward wear member, the wear member base including the mounting side and the first flange, the outward wear member including the wear exposed side, the outward wear member being secured to the wear member base.

17. The mechanically attached wear plate system of claim 13 wherein the wear member further includes an apron extending from a peripheral surface of the mounting side, and the mounting base includes an outer peripheral surface, the apron being sized and adapted to be disposed adjacent the outer peripheral surface of the mounting base.

18. The mechanically attached wear plate system of claim 17 wherein the wear member further includes a second flange extending from the mounting side, the second flange including a second wear member engagement surface, the mounting base further includes a second engagement recess including a second mounting base engagement surface, the wear member apron includes a substantially circular inner surface, and the outer peripheral surface of the mounting base is substantially circular.

* * * * *